Oct. 4, 1938.  T. C. WHISLER  2,132,198
BUCKET CHAIN TUMBLER
Filed March 30, 1936
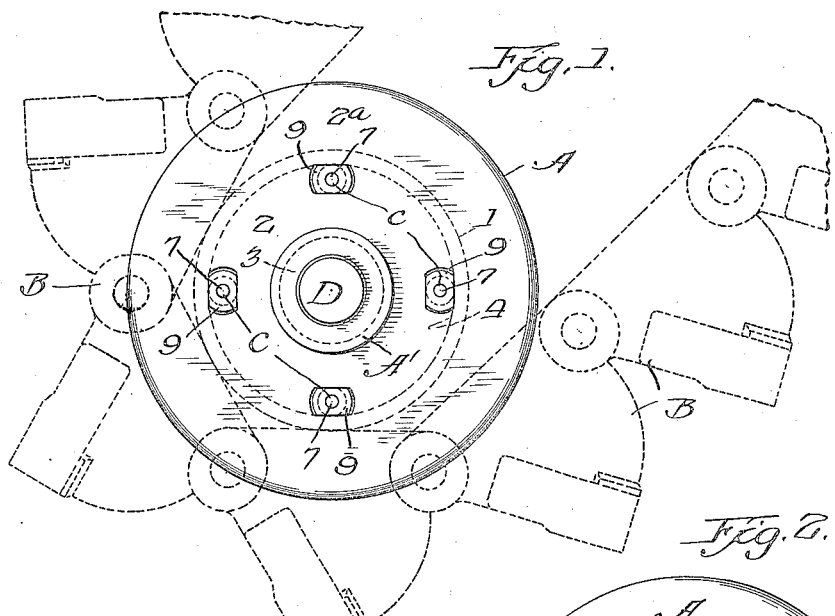
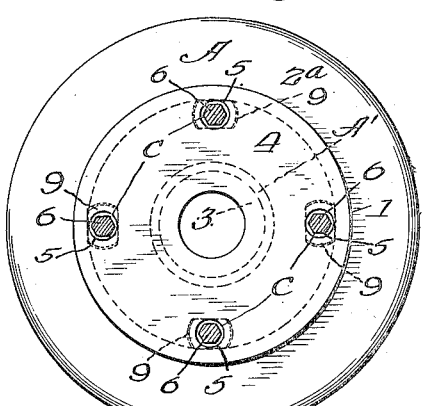
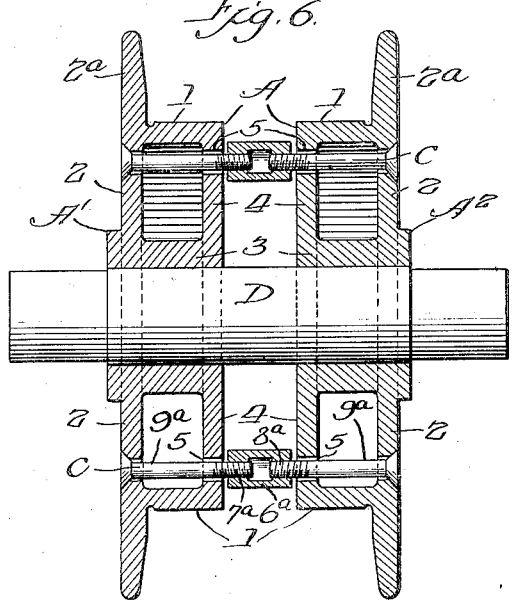
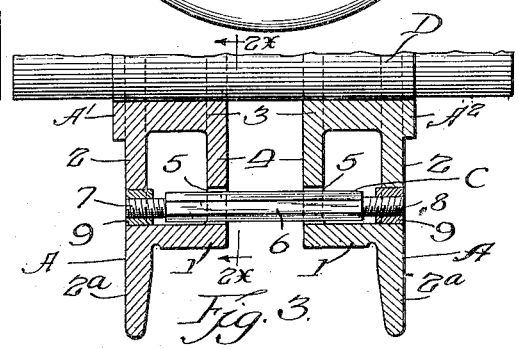
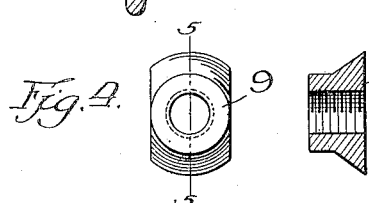
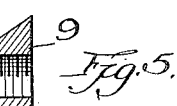
Inventor:
Thomas C. Whisler
By Wilkinson Huxley Byron Knight
Attys Patented Oct. 4, 1938

2,132,198

UNITED STATES PATENT OFFICE 2,132,198

BUCKET CHAIN TUMBLER

Thomas C. Whisler, Berkeley, Calif., assignor to The American Brake Shoe and Foundry Company, a corporation of Delaware Application March 30, 1936, Serial No. 71,604

4 Claims. (Cl. 74—243)

This invention relates to tumblers used for confining and guiding the buckets of endless chain dredges. These tumblers are conventionally made of two identical flanged members mounted in apposition upon a shaft so that while their flanges confine the chain of buckets against lateral displacement in opposite directions, their tread portions together provide the bearing surface over which the buckets run.

The nature of the stresses imposed by the buckets passing over tumblers of this kind is such that the metal of the treads as heretofore designed, and especially when made of manganese steel, flows in response to these stresses in a direction that results in circumferential enlargement of the tread, particularly near the unrestrained portion of the tread or the portion which is remote from the radial web through which the tread is mounted upon the hub. The result is that the treads become distorted, the confining flanges are gradually thrown out of their plane, and the wearing life of the tumbler is unduly shortened.

One object of the present invention is to prolong the usefulness of tumblers of the kind referred to by preventing the circumferential enlargement and consequent distortion of their treads; and to this end, one feature of the invention proceeds upon the principle of designing each of the two members which make up the tumbler with not only the conventional hub, radial supporting web and barrel-like tread portion extending in the direction of the axis of the tumbler from its said supporting web, but with an adjunctive web or flange—which I shall herein term "growth resisting web"—extending inwardly from that portion of the tread which is remote from its conventional supporting web, is circumferentially continuous and co-extensive with the tread to which it is united, and extends radially inward a distance sufficient to resist radial expansion of the tread and preferably all the way inward to the hub which is sufficiently elongated axially to receive it and be integrally united to it.

Another object of the present invention is to so construct and dispose the assembly screws employed for drawing axially toward each other the two constituent tumbler members that instead of necessitating individual adjustment of a nut at each end of each screw, rotatably seated in the supporting webs of the tumbler with consequent interference of friction with the operative's estimate of tension being applied, screw adjustment may be attained simultaneously at both ends by the turning of a single member of each assembly screw and without friction other than that incident to the interengaging threads; and the tension applied to the several assembly screws being sufficiently appreciable by the experienced operative to enable him to impart approximately uniform tension to all of the circumferentially distributed screws. A collateral object is to develop substantial support for the assembly screws at points axially removed from the outer web in which the screws are anchored.

Accordingly, other features of the present invention proceed upon the principle of constructing each assembly screw of three parts, namely, two anchoring parts which are seated non-notatably in the respective outer radial supporting webs, and a third part having right and left threaded connections with the respective anchoring parts, and feeding both the latter simultaneously inward or outward according to direction of rotation of the rotatable part and having all of the rotatable parts of the assembly screws accessible for adjustment near a medial plane of the assembled tumbler; the assembly screws being not only anchored at their ends in the respective outer radial webs of the tumbler members, but being made to pass through openings in the growth-resisting webs, and the latter, while leaving the rotatable portions of the screws free to turn, having the confines of their openings sufficiently near to the assembly screws to limit flexing and prevent breaking of the screws under pressure of a stone or other object that may become trapped between the bucket chain and the tumbler.

In the accompanying drawing—

Figure 1 is an axial view of the new tumbler together with dotted line indication of a portion of the endless bucket chain with which it is to be used.

Figure 2 is a section on the line 2x—2x of Figure 3, which presents the inner face of one of the two tumbler members in elevation and the assembly screws in section.

Figure 3 is a half axial section of the tumbler shown in Figures 1 and 2.

Figure 4 is a face view of one of the anchoring nuts used in Figures 1, 2 and 3.

Figure 5 is a section on the line 5—5 of Figure 4; and

Figure 6 is an axial section of the tumbler shown in Figures 1 and 2, but with a modified form of three-part assembly screws.

A represents a tumbler adapted to receive and guide a bucket chain B; said tumbler being constructed with two identical members A', A2, connected by assembly screws C consisting of tread members 1 supported by outer radial webs 2 upon hubs 3 and preferably having confining flanges 2a in line with said outer webs 2. The treads 1 constituting barrel-like axial extensions from the supporting webs 2, are conventionally left open at their inner ends and, especially when the tumbler is made of rather ductile metal such as manganese steel, yield and flow under the limited surface contact and drag of the straight under sides of the buckets. This causes circumferential growth of the treads with outward displacement of their flanges 2a and other distortions, with the result that the tumbler in many instances has to be discarded before it is worn out.

The present invention reinforces the inner ends of the treads 1 against such distortions by constructing them with adjunctive growth-resisting webs 4, circumferentially continuous and co-extensive and integral with said treads and extending inwardly therefrom at least a distance ample to prevent circumferential enlargement under the flow of the metal, and preferably integrally united with the hubs 3.

Another disadvantage of the open and unsupported inner ends of treads 1 arises from the lack of protection to the assembly screws C from pieces of rock that sometimes enter into the space between the tumbler members and are pressed against said screws by the traveling buckets. The present invention utilizes the adjunctive inner webs 4 as a means of limiting the flexing of the screws C and protecting them against breakage by causing said screws to extend through openings 5 in said inner webs and permitting them to rest against the confines of said openings before the screws can be flexed sufficiently to injure them.

Finally, the present invention affords facility for uniformly tensioning the assembly screws of a tumbler of the kind described; to which end, its screws are constructed of three portions, namely, an intermediate turning portion 6 having right and left hand threads 7, 8, through which they are received in the anchoring members 9 that are non-rotatably seated in the webs 2, 2a.

According to Figures 1, 2, and 3, the anchoring portions 9 are axially short and in the form of nuts of non-round section seated in webs 2 with their major dimensions presented circumferentially thereof in order to permit the assembly screws to be located at a greater distance from the axis of the tumbler; and the intermediate turning portions 6 in this case extend through the openings 5 and serve as the portions that come into bearing and establish support for the screw in the event of encounter with an obstruction in the operation of the dredge.

In Figure 6, the anchoring members 9a, non-rotatably seated in the outer webs 2, are relatively long and are made to carry the right and left threads 7a, 8a which in this instance cooperate with a central sleeve 6a after the manner of a turnbuckle. In this instance, the anchoring members 9a constitute the portions that receive support against the inner growth-resisting web 4.

In the construction and disposal of assembly screws in accordance with the present invention, these screws are located parallel to the axis of the tumbler and between the treads 1 and hubs 3 as heretofore, but instead of having to independently turn several nuts at the ends of the assembly screws as heretofore, and thus make eight adjustments instead of four, and instead of turning each nut against the large friction incident to seating a rotatable member on manganese steel, the screws of the present invention are adjusted relatively to both web members simultaneously by rotating their middle portions while their anchoring portions remain fixed against rotation, and the friction to be overcome in making these adjustments is only that which is developed between screw threads, so that it becomes comparatively easy for an operative to judge of the tension put upon each assembly screw and therefore attain uniformity throughout the several connecting points circumferentially distributed around the tumbler.

I claim:

1. In a bucket chain dredger, a tumbler for confining and guiding the bucket chain, said tumbler comprising a pair of coaxially opposed tumbler members, each individual tumbler member of the pair comprising a hub, a radial supporting web integral with said hub and normally subjected to axially outward tipping forces by the buckets, a circumferentially continuous tread integrally united with and extending axially inward from said supporting web and normally subjected to forces tending to create circumferential enlargement also imposing axially outward displacement of said supporting web, and a circumferentially continuous anti-tipping and growth-resisting strutting web extending radially inward from and integral with said tread, remote from said supporting web, and means anchored in the tread supporting webs, tying together the tumbler members and transmitting support from each tumbler member to the supporting web of the other member, against the stresses stated.

2. In a bucket chain dredger, a tumbler for confining and guiding the bucket chain, said tumbler comprising a pair of coaxially opposed tumbler members, each individual tumbler member of the pair comprising a hub, a radial supporting web integral with said hub and normally subjected to axially outward tipping forces by the buckets, a circumferentially continuous tread integrally united with and extending axially inward from said supporting web and normally subjected to forces tending to create circumferential enlargement also imposing axially outward displacement of said supporting web, and a circumferentially continuous anti-tipping and growth-resisting strutting web extending radially inward from and integral with said tread, remote from said supporting web, said last-named web extending to and being integrally connected with said hub, and means anchored in the tread supporting webs, tying together the tumbler members and transmitting support from each tumbler member to the supporting web of the other member, against the stresses stated.

3. In a bucket chain dredger, a tumbler for confining and guiding the bucket chain, said tumbler comprising a pair of coaxially opposed suitably united tumbler members, each individual tumbler member of the pair comprising a hub, a radial supporting web integral with said hub and normally subjected to axially outward tipping forces by the buckets, a circumferentially continuous tread integrally united with and extending axially inward from said supporting web and normally subjected to forces tending to create circumferential enlargement also imposing axially outward displacement of said supporting web, and a circumferentially continuous anti-tipping and growth-resisting strutting web extending radially inward from and integral with said tread, remote from said supporting web.

4. In a bucket chain dredger, a tumbler for confining and guiding the bucket chain, said tumbler comprising a pair of coaxially opposed suitably united tumbler members, each individual tumbler member of the pair comprising a hub, a radial supporting web integral with said hub and normally subjected to axially outward tipping forces by the buckets, a circumferentially continuous tread integrally united with and extending axially inward from said supporting web and normally subjected to forces tending to create circumferential enlargement also imposing axially outward displacement of said supporting web, and a circumferentially continuous anti-tipping and growth-resisting strutting web extending radially inward from and integral with said tread, remote from said supporting web, said last-named web extending to and being integrally connected with said hub.

THOMAS C. WHISLER.